(12) United States Patent
Aliakbarzadeh et al.

(10) Patent No.: US 7,894,972 B2
(45) Date of Patent: Feb. 22, 2011

(54) METHOD AND DEVICE FOR OPERATING AN INTERNAL COMBUSTION ENGINE

(75) Inventors: Reza Aliakbarzadeh, Regensburg (DE); Carlos Eduardo Migueis, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 145 days.

(21) Appl. No.: 12/296,442

(22) PCT Filed: May 31, 2007

(86) PCT No.: PCT/EP2007/055315

§ 371 (c)(1), (2), (4) Date: Dec. 10, 2008

(87) PCT Pub. No.: WO2008/017528

PCT Pub. Date: Feb. 14, 2008

(65) Prior Publication Data

US 2009/0272367 A1  Nov. 5, 2009

(30) Foreign Application Priority Data

Aug. 11, 2006  (DE) ................. 10 2006 037 752

(51) Int. Cl.
*B60T 7/12* (2006.01)
(52) U.S. Cl. .................... 701/103; 123/434
(58) Field of Classification Search ............... 701/103, 701/104, 105; 123/434, 673
See application file for complete search history.

(56) References Cited

U.S. PATENT DOCUMENTS

| | | | |
|---|---|---|---|
| 6,840,214 B2 * | 1/2005 | Yasui | 123/344 |
| 7,051,516 B2 * | 5/2006 | Pott et al. | 60/285 |
| 7,331,214 B2 * | 2/2008 | Aliakbarzadeh et al. | 73/23.32 |
| 7,726,276 B2 * | 6/2010 | Aliakbarzadeh et al. | 123/299 |
| 7,762,244 B2 * | 7/2010 | Aliakbarzadeh | 123/693 |
| 2004/0003804 A1* | 1/2004 | Yasui | 123/673 |

(Continued)

FOREIGN PATENT DOCUMENTS

DE  10304245  7/2004

(Continued)

OTHER PUBLICATIONS

International Search Report and Written Opinion; PCT/EP2007/055315; pp. 11, Sep. 17, 2007.

*Primary Examiner* — John T Kwon
(74) *Attorney, Agent, or Firm* — King & Spalding L.L.P.

(57) ABSTRACT

By a respective cylinder-specific lambda regulator, a regulator value for influencing the air/fuel ratio in the respective cylinder is determined as a function of the cylinder-specific air/fuel ratio measured for the respective cylinder. The regulator value is monitored for the attainment of a first predefined threshold value, and when the latter is reached, a lambda quality value is determined which is representative of the deviation of the measured cylinder-specific air/fuel ratios assigned to the respective cylinders. The regulator value is monitored for the attainment of a second predefined threshold value which is representative of a more pronounced regulating intervention than the first threshold value. When the second predefined threshold value is reached, the lambda quality value is determined. If the lambda quality value assigned to the first threshold value is lower than the value assigned to the second threshold value, unstable regulating behavior is identified. Stable regulating behavior is identified otherwise.

12 Claims, 4 Drawing Sheets

U.S. PATENT DOCUMENTS

2007/0119436 A1   5/2007   Aliakbarzadeh et al.

FOREIGN PATENT DOCUMENTS

| DE | 10304245 B3 | 7/2004 |
| DE | 102004004291 | 1/2005 |
| DE | 102004004291 B3 | 1/2005 |
| EP | 1132599 | 1/2001 |
| EP | 1132599 A1 | 9/2001 |

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2007/055315 filed May 31, 2007, which designates the United States of America, and claims priority to German Application No. 10 2006 037 752.4 filed Aug. 11, 2006, the contents of which are hereby incorporated by reference in their entirety.

TECHNICAL FIELD

The invention relates to a method and a device for operating an internal combustion engine having a plurality of cylinders and injection valves which are assigned to the cylinders and meter fuel, and having an exhaust gas tract in which is disposed an exhaust gas probe whose measured signal is characteristic of the air/fuel ratio in the respective cylinder.

BACKGROUND

Increasingly stringent statutory regulations in relation to permissible pollutant emissions from motor vehicles in which internal combustion engines are disposed make it necessary to keep the pollutant emissions produced during the operation of the internal combustion engine to an absolute minimum. This can be achieved firstly by reducing the pollutant emissions that are produced during the combustion of the air/fuel mixture in the respective cylinder of the internal combustion engine. Secondly, use is also made in internal combustion engines of exhaust gas aftertreatment systems which convert the pollutant emissions that are generated during the combustion process of the air/fuel mixture in the respective cylinders into harmless substances. For that purpose exhaust gas catalytic converters are used which convert carbon monoxide, hydrocarbons and nitrogen oxides into harmless substances. Both the targeted influencing of the generation of the pollutant emissions during combustion and the converting of the pollutant components with a high degree of efficiency by means of an exhaust gas catalytic converter are predicated on a very precisely adjusted air/fuel ratio in the respective cylinder.

In particular in connection with an increasing trend to dispose the exhaust gas catalytic converters very close to the engine, a precise, cylinder-specific adjustment of the air/fuel ratio is also increasingly important, since the individual exhaust gas packages intermix only relatively poorly due to the short mixing section. For cost reasons, however, only one exhaust gas probe is generally disposed upstream of the respective exhaust gas catalytic converter at the respective exhaust gas branch of the exhaust gas tract.

For the purpose of a cylinder-selectively precise setting of the respective air/fuel ratio in the respective combustion chambers of the respective cylinders it is known from DE 10 2004 004 291 B3 to use a cylinder-selective lambda control by means of which the individual deviations of the respective cylinder-selective air/fuel ratios are to be minimized to an average air/fuel ratio. A measured signal of an exhaust gas probe disposed in an exhaust gas tract, which signal is characteristic of the air/fuel ratio in the respective cylinder, is recorded at a predefined crankshaft angle in relation to a reference position of the piston of the respective cylinder and assigned to the respective cylinder. An actuating variable for influencing the air/fuel ratio in the respective cylinder is generated by means of the cylinder-individual lambda controller as a function of the measured signal recorded for the respective cylinder. The predefined crankshaft angle is adjusted as a function of an instability criterion of the controller.

From DE 103 04 245 B3 it is known to employ an optimization method for improving the control behavior of a cylinder-individual lambda control with regard to an adaption; by varying the sampling points for recording the measured signal of the exhaust gas probe both in the positive and in the negative direction, the method optimizes a characteristic which is indicative of the deviation of the individual measured lambda values.

SUMMARY

A method and a device for operating an internal combustion engine can be provided that allow simple and precise operation of the internal combustion engine.

A method for operating an internal combustion engine having a plurality of cylinders and, assigned to the cylinders, injection valves which meter fuel, and having an exhaust gas tract in which is disposed an exhaust gas probe whose measured signal is characteristic of the air/fuel ratio in the respective cylinder, may comprise the steps of: —recording the measured signal at a predefined crankshaft angle in relation to a reference position of the piston of the respective cylinder and assigning the measured signal to the respective cylinder as the recorded cylinder-specific air/fuel ratio, —by means of in each case a cylinder-specific lambda controller, determining a controller value for influencing the air/fuel ratio in the respective cylinder as a function of the cylinder-specific air/fuel ratio recorded for the respective cylinder and activating the injection valve assigned to the cylinder in each case as a function of the respective controller value, —monitoring the controller value to check if a first predefined threshold value has been reached and upon the first threshold value being reached determining a lambda quality value which is representative of the deviation of the recorded cylinder-specific air/fuel ratios assigned to the respective cylinders, —monitoring the controller value to check for the reaching of a second predefined threshold value which is representative of a more pronounced control intervention than the first threshold value, and when the second threshold value is reached the lambda quality value is determined, —making a check to determine whether the lambda quality value assigned to the first threshold value is less than the lambda quality value assigned to the second threshold value, and if that is the case, an unstable control behavior is diagnosed; if that is not the case, diagnosing a stable control behavior.

According to another embodiment, a device for operating an internal combustion engine may comprise a plurality of cylinders and, assigned to the cylinders, injection valves which meter fuel, and an exhaust gas tract in which is disposed an exhaust gas probe whose measured signal is characteristic of the air/fuel ratio in the respective cylinder, wherein the device is operable to: —record the measured signal at a predefined crankshaft angle in relation to a reference position of the piston of the respective cylinder and to assign said signal to the respective cylinder as the recorded cylinder-specific air/fuel ratio, —determine, by means of in each case a cylinder-specific lambda controller, a controller value for influencing the air/fuel ratio in the respective cylinder as a function of the cylinder-specific air/fuel ratio recorded for the respective cylinder and to activate the injection valve assigned to the cylinder in each case as a function of the respective controller value, —monitor the controller value to check if a first predefined threshold value has been reached and upon the first threshold value being reached to determine a lambda quality value which is representative of the deviation of the recorded cylinder-specific air/fuel ratios assigned to the respective cylinders, —monitor the controller value to check for the reaching of a second predefined threshold value which is representative of a more pronounced control intervention than the first threshold value, and when the second threshold value is reached, to determine the lambda quality value, —check whether the lambda quality value assigned to the first threshold value is less than the lambda quality value assigned to the second threshold value, and if that is the case, to detect an unstable control behavior, and if that is not the case, to detect a stable control behavior.

According to a further embodiment, the unstable control behavior may not be diagnosed until after the lambda quality value assigned in the first threshold value has been detected several times as less than the lambda quality value assigned to the second threshold value. According to a further embodiment, if unstable control behavior is detected, the predefined crankshaft angle may be adjusted. According to a further embodiment, a respective adaption value which is assigned to each cylinder can be adjusted at predefined time intervals as a function of the controller value assigned to the corresponding cylinder, and the respective adaption value can be reset to its value that it assumed in one of the predefined past time intervals if the unstable control behavior is detected, and the adaption value may not be adjusted again until stable control behavior is detected. According to a further embodiment, the lambda quality value may be determined based on the sum total of the deviations in terms of amount of the recorded cylinder-specific air/fuel ratios assigned to the respective cylinders from the average value of the recorded cylinder-specific air/fuel ratios assigned to the respective cylinders. According to a further embodiment, the respective controller value may be reset to a predefined basic value when the respective cylinder-specific lambda controller is deactivated.

BRIEF DESCRIPTION OF THE DRAWINGS

Exemplary embodiments are explained in more detail below with reference to the schematic drawings, in which.

Elements of identical construction and function are identified by the same reference signs throughout the figures.

DETAILED DESCRIPTION

According to various embodiments, in a method and a corresponding device for operating an internal combustion engine having a plurality of cylinders and, assigned to the cylinders, injection valves which meter fuel, and having an exhaust gas tract in which is disposed an exhaust gas probe whose measured signal is characteristic of the air/fuel ratio in the respective cylinder, the measured signal is recorded at a predefined crankshaft angle in relation to a reference position of the piston of the respective cylinder and assigned to the respective cylinder as a recorded cylinder-specific air/fuel ratio. By means of a cylinder-specific lambda controller in each case a controller value for influencing the air/fuel ratio in the respective cylinder is determined as a function of the cylinder-specific air/fuel ratio recorded for the respective cylinder and the injection valve assigned to the respective cylinder in each case is activated as a function of the respective controller value. The controller value is monitored to check if a first predefined threshold value has been reached and upon the first threshold value being reached a lambda quality value is determined which is representative of the deviation of the cylinder-specific air/fuel ratios assigned to the respective cylinders. The controller value is also monitored to check for the reaching of a second predefined threshold value which is characteristic of a more pronounced control intervention than in the case of the predefined first threshold value. When the second threshold value is reached by the controller value the lambda quality value is likewise determined. In addition a check is made to determine whether the lambda quality value assigned to the first threshold value is less than the lambda quality value assigned to the second threshold value. If that is the case, an unstable control behavior is detected. If that is not the case, a stable control behavior is detected. In this way it is made possible to detect the unstable control behavior in an extremely timely manner.

This can be particularly advantageous in particular in connection with the use of an actuator which is subject to a great variance in terms of the actuator characteristics and which is assigned to the cylinder-specific lambda controller. The actuator is preferably a piezoelectric actuator of an injection valve. In this way a significantly more timely detection of the unstable control behavior can be made possible in particular in contrast to a missing distinction between an adaption and a controller value, i.e. in the case of a combined evaluation of the adaption and controller value.

This can be a substantial advantage with particular regard to the even temporary avoidance of pollutant emissions. Furthermore a possible adaption value can assume a value range suitably geared to the variances of the actuator characteristics without a significant disadvantageous impact on the timely detection of the unstable control behavior. Particularly preferably the second threshold value will correspond approximately to a control limit of the controller value, i.e. its extreme value.

According to an embodiment the unstable control behavior will not be diagnosed until the lambda quality value assigned to the first threshold value has been detected several times as less than the lambda quality value assigned to the second threshold value. In this way an erroneous assumption of unstable control behavior can very reliably be avoided.

According to a further embodiment, the predefined crankshaft angle is adjusted if unstable control behavior is detected. In this connection use is made of the knowledge that unstable control behavior is an indication of an erroneous assignment of the measured signal of the exhaust gas probe to the air/fuel ratio of the respective cylinder.

According to a further embodiment a respective adaption value assigned to each cylinder is adjusted at predefined time intervals as a function of the controller value assigned to the corresponding cylinder and the respective adaption value is reset to its value that it assumed in one of the predefined past time intervals if the unstable control behavior is detected. The adaption value is not then adjusted again until stable control behavior is detected.

An erroneous adaption can thus be effectively avoided in a timely manner.

According to a further embodiment the lambda quality value is determined based on the sum total of the deviations in terms of amount of the recorded cylinder-specific air/fuel ratios assigned to the respective cylinders from the average value of all of the recorded cylinder-specific air/fuel ratios assigned to the respective cylinders. This is particularly simple.

In this connection and also in other respects it is readily apparent to the person skilled in the art that just as well in the case of a multi-branch exhaust gas tract, such as is the case for example with a plurality of cylinder banks, one exhaust gas probe is provided per exhaust gas branch and the respective steps are then also performed in relation to the cylinders assigned to the respective exhaust gas branch.

According to a further embodiment the respective controller value is reset to a predefined basic value when the respective cylinder-specific lambda controller is deactivated. In this way the necessary controller value can thus be reached quickly in particular in different operating states. In this way it is thus also possible to avoid a hanging of the controller value, in particular at an extreme value. This enables a particularly efficient detection of stable or unstable control behavior. A deactivation preferably takes place in particular outside of a quasi-stationary operating state of the internal combustion engine.

An internal combustion engine (FIG. 1) comprises an intake tract 1, an engine block 2, a cylinder head 3 and an exhaust gas tract 4. The intake tract 1 preferably comprises a throttle valve 11, plus a manifold 12 and intake pipe 13 which is routed to a cylinder Z1 via an inlet port into the engine block 2. The engine block 2 also comprises a crankshaft 21 which is coupled to the piston 24 of the cylinder Z1 via a connecting rod 25.

Figure 1:
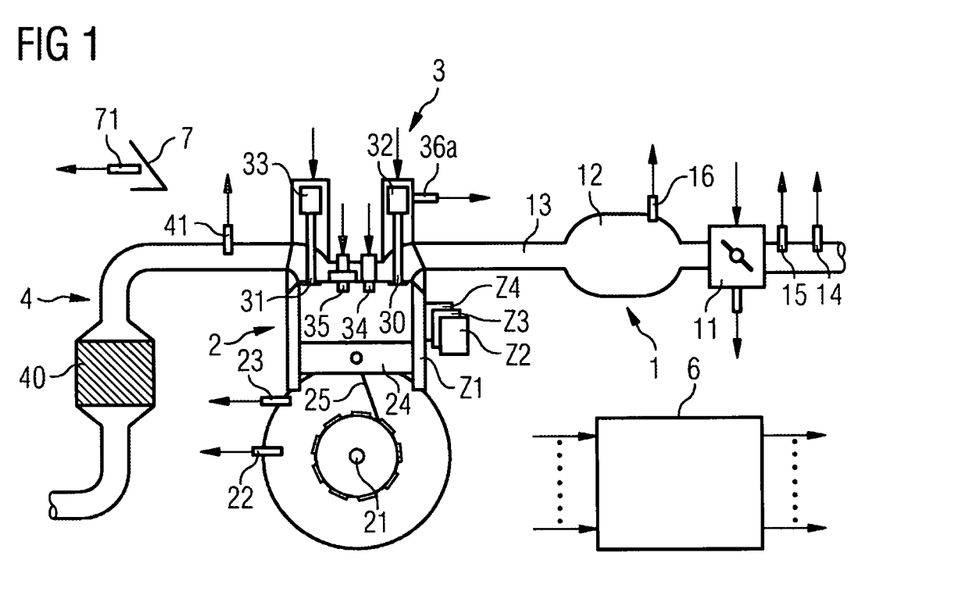
FIG. 1 shows an internal combustion engine with a control device.

The cylinder head 3 comprises a valve train assembly having a gas inlet valve 30, a gas outlet valve 31 and valve gears 32, 33. The cylinder head 3 also comprises an injection valve 34 and a spark plug 35. Alternatively the injection valve 34 can also be disposed in the intake tract 1.

The exhaust gas tract 4 comprises an exhaust gas catalytic converter 40 which is preferably embodied as a three-way catalytic converter.

A control device 6 is provided to which sensors are assigned, the sensors recording the different measured variables and determining the measured values of the measured variable. Operating variables also include, in addition to the measured variables, variables derived from the latter. Based on at least one of the operating variables, the control device 6 controls the actuating elements which are assigned to the internal combustion engine, and to which corresponding actuating drives are assigned in each case, by generating actuating signals for the actuating drives.

The control device 6 can also be referred to as a device for operating the internal combustion engine.

The sensors are a pedal position sensor 71, which registers the position of an accelerator pedal 7, an air mass meter 14, which records an air mass flow upstream of the throttle valve 11, a temperature sensor 15, which records an intake air temperature, a pressure sensor 16, which records the intake pipe pressure, a crankshaft angle sensor 22, which registers a crankshaft angle to which a rotational speed N is then assigned, a further temperature sensor 23, which records a coolant temperature, a camshaft angle sensor 36a, which registers a camshaft angle, and an exhaust gas probe 41, which records a residual oxygen content of the exhaust gas and whose measured signal is characteristic of the air/fuel ratio in the cylinder Z1 during the combustion of the air/fuel mixture. The exhaust gas probe 41 is preferably embodied as a linear lambda probe and thus generates, over a wide relevant range of the air/fuel ratio, a measured signal proportional to the latter.

Depending on embodiment, an arbitrary subset of the cited sensors can be present or additional sensors may also be present.

The actuating elements are, for example, the throttle valve 11, the gas inlet and gas outlet valves 30, 31, the injection valve 34 or the spark plug 35.

In addition to the cylinder Z1, further cylinders Z2 to Z4 are also provided, to which corresponding actuating elements are then also assigned. Each exhaust gas bank of cylinders, which can also be referred to as a cylinder bank, is preferably assigned an exhaust gas branch of the exhaust gas tract 4 in each case and the respective exhaust gas branch is in each case correspondingly assigned an exhaust gas probe 41.

Figure 2:
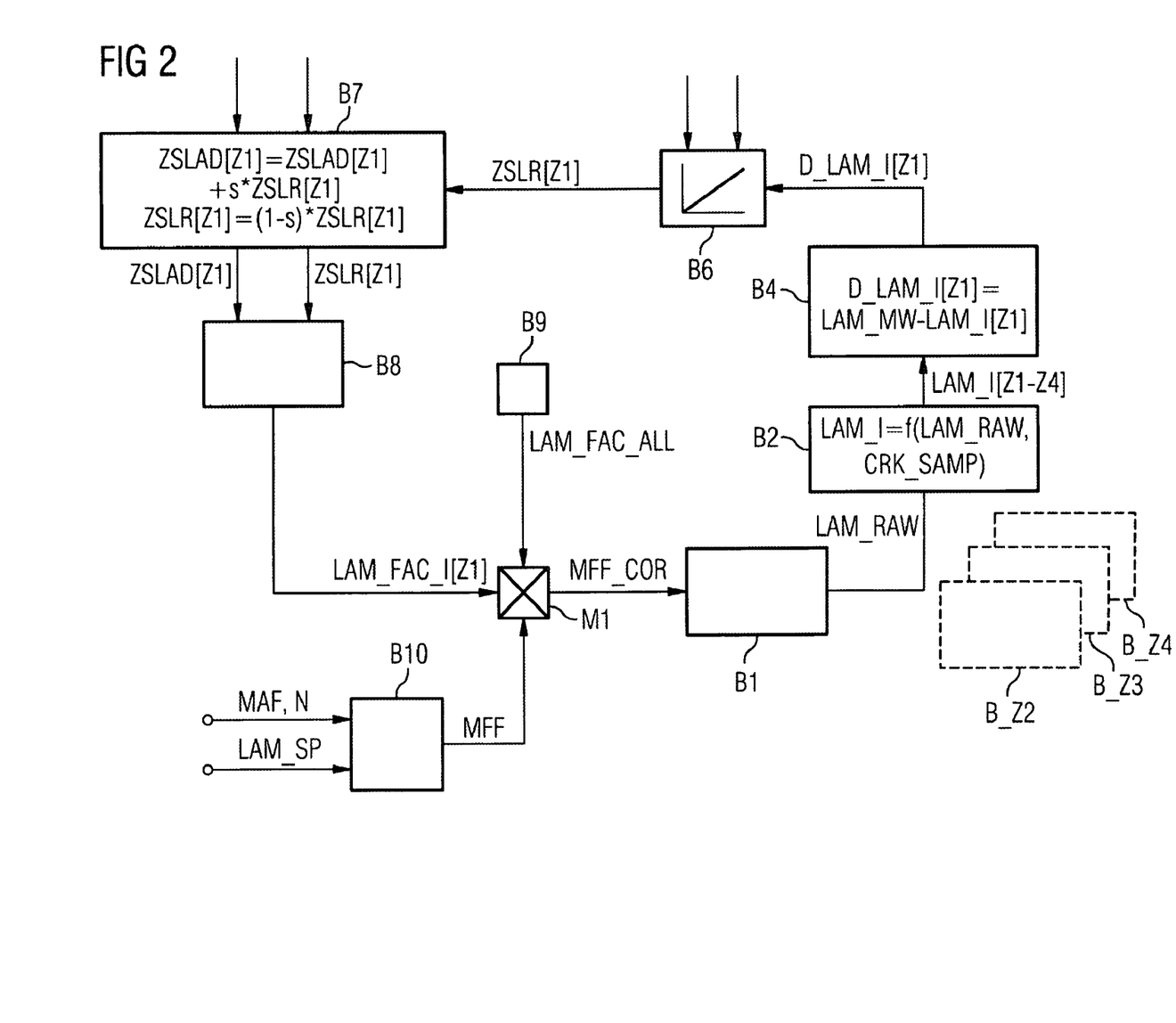
FIG. 2 shows a block diagram of the control device.

A block diagram of parts of the control device 6 is shown with reference to FIG. 2. A block B1 corresponds to the internal combustion engine. An air/fuel ratio LAM RAW recorded by the exhaust gas probe 41 is fed to a block B2. At in each case predefined crankshaft angles CRK_SAMP in relation to a reference position of the respective piston 24 of the respective cylinder Z1 to Z4, the air/fuel ratio currently recorded at this instant and derived from the measured signal of the exhaust gas probe 41 is then assigned in the block B2 to the respective air/fuel ratio of the respective cylinder and thus is assigned as the recorded cylinder-specific air/fuel ratio LAM_I. A reference sign placed in square brackets for the respective cylinder Z1 to Z4 indicates here in each case the assignment of the respective variable, i.e. for example of the recorded cylinder-specific air/fuel ratio LAM_I for the respective cylinder Z1-Z4. The block diagram is explained in detail below with regard to the procedure in respect of the cylinder Z1. A corresponding approach is, though, also provided in respect of the other cylinders Z2 to Z4.

The reference position of the respective piston 24 is preferably its top dead center. The predefined crankshaft angle CRK_SAMP is applied as a fixed value for example for a first starting-up of the internal combustion engine and is subsequently adjusted if necessary on the basis of the programs explained further below.

In a block B4, an average air/fuel ratio LAM_MW is determined by averaging the recorded cylinder-specific air/fuel ratios LAM_I[Z1-Z4]. A deviation D_LAM_I[Z1] of the recorded cylinder-specific air/fuel ratio LAM_I[Z1] from the average air/fuel ratio LAM_MW is also determined in the block B4. As an error variable, the deviation D_LAM_I[Z1] forms an input variable of the block B6 which comprises a cylinder-specific lambda controller and in which a controller value ZSLR is determined for influencing the air/fuel ratio in the respective cylinder Z1 to Z4 as a function of the deviation D_LAM_I[Z1]. The cylinder-specific lambda controller preferably includes an integral component. The deviation D_LAM_I[Z1] present at its input is preferably integrated while the cylinder-specific lambda controller is activated. The cylinder-specific lambda controller is preferably activated only when predefined operating conditions are present. Operating conditions of this kind are defined by operating variables of the internal combustion engine and can be present for example when a quasi-stationary operating state of the internal combustion engine is present. Otherwise the cylinder-specific lambda controller is preferably deactivated and the controller value is in this case then preferably reset to a predefined basic value, in particular to a neutral value.

A block B7 comprises an adaption unit which is provided for adapting a respective adaption value ZSLAD assigned to the respective cylinder Z1 to Z4; this preferably takes place at predefined time intervals. In this connection different time intervals can be specified differently. The adaption value ZSLAD, for example, is preferably adjusted roughly every 2 to 3 seconds. In the course of the adjusting of the adaption value a predefinable component of the current controller value ZSLR is added to the adaption value ZSLAD. Preferably a takeover factor s is suitably specified for this purpose. Correspondingly thereto, the controller value ZSLR is complementarily adjusted accordingly when the adaption value ZSLAD is adjusted. On the output side of the block B7 the adaption value ZSLAD and also the controller value ZSLR are then made available to a block B8. The adaption value ZSLAD can be adjusted as a function of a time condition or also additionally or alternatively as a function of predefined values or value curves of operating variables of the internal combustion engine and for example only be adjusted when a quasi-stationary operating state is present.

In the block B8, a cylinder-specific lambda control factor LAM_FAC_I is then determined as a function of the controller value ZSLR and the adaption value ZSLAD. Preferably both the controller value and the adaption value ZSLAD have the value zero as a neutral value and are in each case limited in terms of amount to predefined maximum values which in the case of the adaption value can be for example 0.25 and in the case of the controller value ZSLR can be for example 0.1. Corresponding limiting functions are provided accordingly in the blocks B6 and B7.

Thus, the cylinder-specific lambda control factor LAM_FAC_I is preferably determined by adding the controller value ZSLR and the adaption value ZSLAD to a value one.

In a block B9, a lambda controller is provided whose reference variable is a predefined air/fuel ratio for all of the cylinders Z1 to Z4 of the internal combustion engine and whose control variable is the average air/fuel ratio LAM_MW. The actuating variable of the lambda controller is a lambda control factor LAM_FAC_ALL. The lambda controller therefore has the task of setting the predefined air/fuel ratio considered across all cylinders Z1 to Z4 of the internal combustion engine. If a plurality of cylinder banks are present, a corresponding lambda controller can also be assigned to one cylinder bank in each case.

In a block B10, a fuel mass MFF to be metered is determined as a function of a mass air flow MAF into the respective cylinder Z1 to Z4 and possibly the rotational speed N and a setpoint value LAM_SP of the air/fuel ratio for all cylinders Z1 to Z4.

In the multiplier stage M1, a corrected fuel mass MFF_COR to be metered is determined by multiplying the fuel mass MFF to be metered, the lambda control factor LAM_FAC_ALL and the respective recorded cylinder-specific lambda control factor LAM_FAC_I. Based on the corrected fuel mass MFF_COR to be metered, an actuating signal is then generated by means of which the respective injection valve 34 is activated, said injection valve having in particular a piezoelectric actuator as actuating drive.

In the structure shown in the block diagram of FIG. 2, corresponding structures B_Z2-B_Z4 are provided for each of the respective further cylinders Z2 to Z4 which then comprise corresponding blocks B2-B8.

A program for operating the internal combustion engine is started in a step S1 (FIG. 3) in which variables are initialized if necessary. In a step S2, a check is made to determine whether the respective controller value ZSLR is greater than or equal to a predefined second threshold value ZSLR_THD2. If this is the case, a lambda quality value CQ[ZSLR_THD2] is determined in a step S4 and preferably then also assigned to the respective cylinder Z1-Z4. The lambda quality value CQ[ZSLR_THD2] is preferably determined in such a way that it is a measure for the deviation of the individual recorded cylinder-specific air/fuel ratios LAM_I. The lambda quality value CQ is preferably determined in accordance with the relation specified in step S4, where k represents a counter. Thus, the lambda quality value CQ preferably corresponds to the sum total of the amounts of the deviations D_LAM_I that are assigned to the individual cylinders Z1 to Z4. Next, the processing is then continued at a step S6 which is explained in more detail further below.

Figure 3:
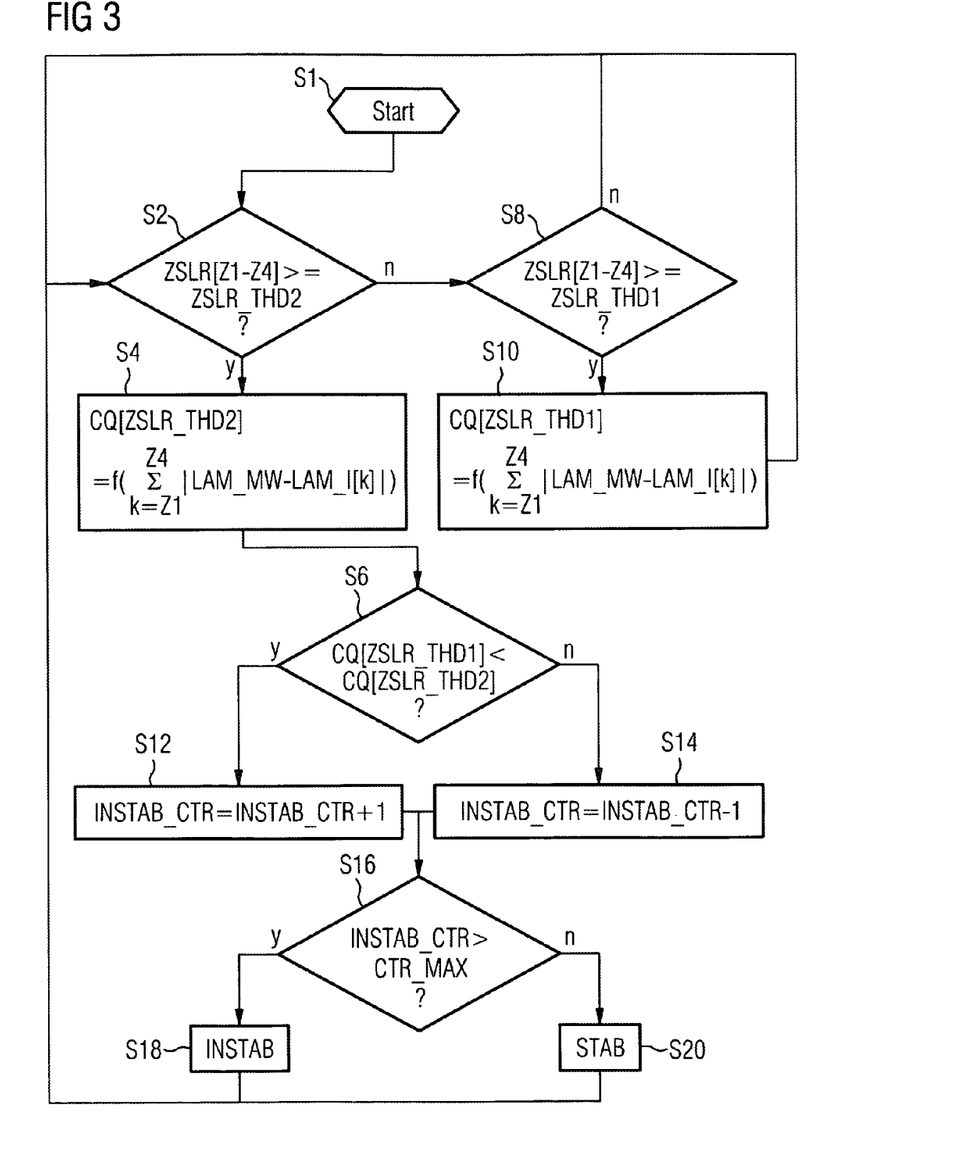
FIG. 3 shows a first flowchart of a program for operating the internal combustion engine.

If, on the other hand, the condition of step S2 is not met, a step S8 is preferably executed. In step S8, a check is made to determine whether the respective controller value ZSLR is greater than or equal to a first threshold value ZSLR_THD1. If this is not the case, the processing is again continued at step S2. If, on the other hand, this is the case, the lambda quality value CQ is determined in a step S10 and assigned to the first threshold value ZSLR_THD1. This takes place preferably in a corresponding manner to the procedure of step S4. The processing is then continued if necessary in step S2.

Steps S2, S4, S8 and S10 are preferably processed virtually in parallel in relation to the respective cylinders Z1 to Z4. In addition it can also be checked in steps S2, S8 whether an amount of the controller value ZSLR is greater than or equal to the respective first or second threshold value ZSLR_THD1, ZSLR_THD2. Alternatively, separate checks can also be carried out and then assigned lambda quality values CQ determined accordingly, depending on whether the respective controller value ZSLR is greater than or less than the neutral value of the controller value ZSLR.

The second threshold value ZSLR_THD2 is predefined such that it is characteristic of a more pronounced control intervention than is the case with the first threshold value ZSLR_THD1.

In this connection the second threshold value ZSLR_THD2 can correspond, for example, to the, in terms of amount, maximally pronounced control intervention with regard to its amount which may be equal to 0.1, for example. The first threshold value ZSLR_THD1 then has a smaller amount by comparison and can have, for example, the amount 0.07.

In step S6, a check is made to determine whether, in relation in each case to one of the cylinders Z1-Z4, the lambda quality value CQ that is assigned to the first threshold value ZSLR_THD1 is less than the lambda quality value CQ that is assigned to the respective second threshold value ZSLR_THD2. If this is the case, this is an indication of a divergence of the control behavior and consequently of an unstable control behavior INSTAB. A step S12 is preferably then executed in which an instability counter INSTAB_CTR is incremented.

If, on the other hand, the condition of step S6 is not met, this is an indication of a convergence of the control behavior and consequently of a stable control behavior STAB. Accordingly, a step S14 is preferably executed in which the instability counter INSTAB_CTR is decremented. Following steps S12 and S14, a step S16 is executed in which a check is made to determine whether the instability counter INSTAB_CTR is greater than a predefined maximum counter value CTR_MAX. The maximum counter value may be three, for example.

If the condition of step S16 is met, an unstable control behavior INSTAB is diagnosed. If, on the other hand, the condition of the step S16 is not met, a stable control behavior STAB is diagnosed. The processing is then preferably continued again at step S2.

Alternatively, the execution of steps S12 to S16 can be skipped and if the condition of step S6 is met, step S20 can be executed directly, and if the condition of step S6 is not meth, step S18 can be executed directly.

Figure 4:
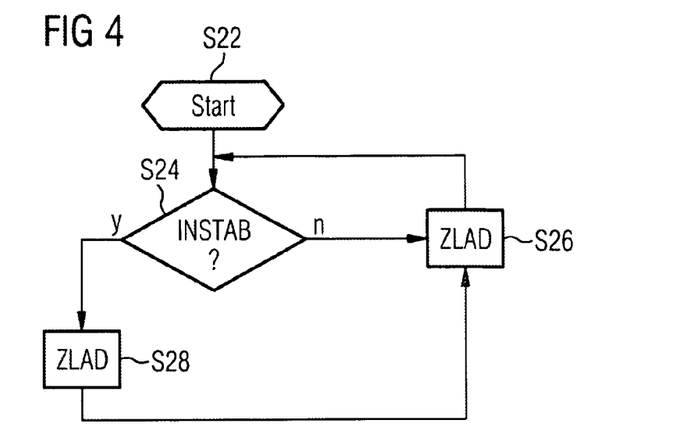
FIG. 4 shows a second flowchart of a further program for operating the internal combustion engine.

A further program for operating the internal combustion engine is started in a step S22 (FIG. 4). Both step S22 and step S5 are preferably executed close in time to a start of the internal combustion engine. Variables can also be initialized in step S22.

In a step S24, a check is made to determine whether unstable control behavior INSTAB has been detected. If this is not the case, the processing is continued at a step S26 in which a new adjustment of the respective adaption values ZLAD[Z1-Z4] is further allowed. Subsequently the processing is continued again at step S24.

If, on the other hand, the condition of step S24 is met, the respective adaption values ZLAD[Z1-Z4] that are assigned to the respective cylinders Z1 to Z4 are preferably reset in a step S28 to a value that they assumed in a predefined past time interval. This can be, for example, the value that they assumed in the last driving cycle.

A further adjustment of the adaption values ZSLAD subsequently is then preferably prevented until stable control behavior STAB has been detected once more. In this way an erroneous adaption can be avoided in a very timely manner. The processing is then continued once again at step S24.

A further program still (FIG. 5) is started in a step S30 in which variables are also initialized if necessary. In a step S32, a check is made to determine whether unstable control behavior INSTAB has been detected. If this is not the case, an angle adaption counter CRK_CTR is decremented in a step S34 and the processing is then continued again at step S32.

Figure 5:
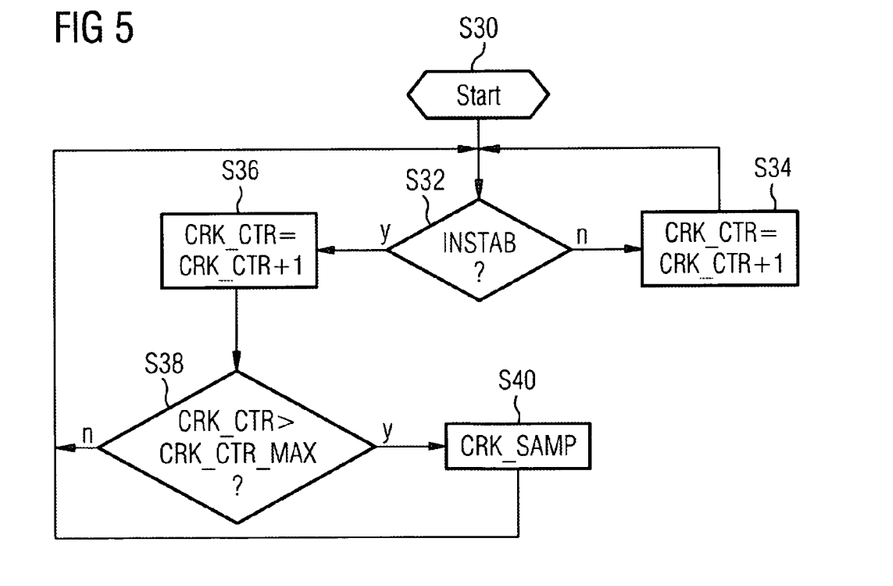
FIG. 5 shows a third flowchart of yet another program for operating the internal combustion engine.

If, on the other hand, the condition of step S32 is met, the angle adaption counter CRK_CTR is incremented in a step S36.

In a step S38, a check is made to determine whether the angle adaption counter CRK_CTR is greater than a predefined angle adaption counter maximum value CRK_CTR_MAX which may be set as three, for example. If this is the case, the predefined crankshaft angle CRK_SAMP is adjusted in a step S40 in which the measured signal of the exhaust gas probe 41 is recorded in relation to the reference position of the piston 24 of the respective cylinder Z1 to Z4 and assigned to the respective cylinder Z1 to Z4 as the recorded cylinder-specific air/fuel ratio (LAM_I).

This can be carried out for example by adjusting the predefined crankshaft angle CRK_SAMP continuously until, for example, the lambda quality value CQ changes in a predefined manner, in particular assumes a predefined value or a predefined extreme value, in particular a minimum. This can be performed for example by means of a corresponding optimization method comprising a minimum or maximum search. A corresponding approach is disclosed for example in DE 103 04 245 D3, the content of which is hereby included herein by reference.

If, on the other hand, the condition of step S38 is not met, the processing is continued at step S32. Following step S40, the processing is likewise continued at step S32.

What is claimed is:

1. A method for operating an internal combustion engine having a plurality of cylinders and, assigned to the cylinders, injection valves which meter fuel, and having an exhaust gas tract in which is disposed an exhaust gas probe whose measured signal is characteristic of the air/fuel ratio in the respective cylinder, the method comprising the steps of:

recording the measured signal at a predefined crankshaft angle in relation to a reference position of the piston of the respective cylinder and assigning the measured signal to the respective cylinder as the recorded cylinder-specific air/fuel ratio, by means of in each case a cylinder-specific lambda controller, determining a controller value for influencing the air/fuel ratio in the respective cylinder as a function of the cylinder-specific air/fuel ratio recorded for the respective cylinder and activating the injection valve assigned to the cylinder in each case as a function of the respective controller value, monitoring the controller value, if the controller value reaches a first predefined threshold value, determining a first lambda quality value which is representative of the deviation of the recorded cylinder-specific air/fuel ratios assigned to the respective cylinders, if the controller value reaches a second predefined threshold value which is representative of a more pronounced control intervention than the first threshold value, determining a second lambda quality value, and determining whether the first lambda quality value is less than the second lambda quality value, and if that is the case, detecting an unstable control behavior, and if that is not the case, detecting a stable control behavior.

2. The method according to claim 1, wherein the unstable control behavior is not detected until after the first lambda quality value has been determined a defined multiple number of times as being less than the second lambda quality value.

3. The method according to claim 1, wherein, if unstable control behavior is detected, the predefined crankshaft angle is adjusted.

4. The method according to claim 1, wherein a respective adaption value which is assigned to each cylinder is adjusted at predefined time intervals as a function of the controller value assigned to the corresponding cylinder, and the respective adaption value is reset to its value that it assumed in one of the predefined past time intervals if the unstable control behavior is detected, and the adaption value is not adjusted again until stable control behavior is detected.

5. The method according to claim 1, wherein at least one of the first and second lambda quality value is determined based on the sum total of the deviations in terms of amount of the recorded cylinder-specific air/fuel ratios assigned to the respective cylinders from the average value of the recorded cylinder-specific air/fuel ratios assigned to the respective cylinders.

6. The method according to claim 1, wherein the respective controller value is reset to a predefined basic value when the respective cylinder-specific lambda controller is deactivated.

7. A device for operating an internal combustion engine comprising a plurality of cylinders and, assigned to the cylinders, injection valves which meter fuel, and comprising an exhaust gas tract in which is disposed an exhaust gas probe whose measured signal is characteristic of the air/fuel ratio in the respective cylinder, wherein the device is operable to:

record the measured signal at a predefined crankshaft angle in relation to a reference position of the piston of the respective cylinder and to assign said signal to the respective cylinder as the recorded cylinder-specific air/fuel ratio, determine, by means of in each case a cylinder-specific lambda controller, a controller value for influencing the air/fuel ratio in the respective cylinder as a function of the cylinder-specific air/fuel ratio recorded for the respective cylinder and to activate the injection valve assigned to the cylinder in each case as a function of the respective controller value, monitor the controller value, if the controller value reaches a first predefined threshold value, determine a lambda quality value which is representative of the deviation of the recorded cylinder-specific air/fuel ratios assigned to the respective cylinders, if the controller value reaches a second predefined threshold value which is representative of a more pronounced control intervention than the first threshold value, determine a second lambda quality value, and determine whether the first lambda quality value is less than the second lambda quality value, and if that is the case, detect an unstable control behavior, and if that is not the case, detect a stable control behavior.

8. The device according to claim 7, wherein the unstable control behavior is not detected until after the first lambda quality value assigned in the first threshold value has been determined a defined multiple number of times as being less than the second lambda quality value.

9. The device according to claim 7, wherein, if unstable control behavior is detected, the predefined crankshaft angle is adjusted.

10. The device according to claim 7, wherein a respective adaption value which is assigned to each cylinder is adjusted at predefined time intervals as a function of the controller value assigned to the corresponding cylinder, and the respective adaption value is reset to its value that it assumed in one of the predefined past time intervals if the unstable control behavior is detected, and the adaption value is not adjusted again until stable control behavior is detected.

11. The device according to claim 7, wherein at least one of the first and second lambda quality value is determined based on the sum total of the deviations in terms of amount of the recorded cylinder-specific air/fuel ratios assigned to the respective cylinders from the average value of the recorded cylinder-specific air/fuel ratios assigned to the respective cylinders.

12. The device according to claim 7, wherein the respective controller value is reset to a predefined basic value when the respective cylinder-specific lambda controller is deactivated.

* * * * *